US009282364B2

(12) United States Patent
Ortiz et al.

(10) Patent No.: US 9,282,364 B2
(45) Date of Patent: Mar. 8, 2016

(54) SYSTEMS AND METHODS FOR ENABLING SIMULTANEOUS SECOND SCREEN VIDEO SEGMENT REPLAY DURING ONGOING PRIMARY SCREEN PROGRAMMING

(71) Applicants: Isabella V. Ortiz, Albuquerque, NM (US); Luis M. Ortiz, Albuquerque, NM (US)

(72) Inventors: Isabella V. Ortiz, Albuquerque, NM (US); Luis M. Ortiz, Albuquerque, NM (US)

(73) Assignee: Ortiz and Associates Consulting, LLC, Albuquerque, NM (US)

( * ) Notice: Subject to any disclaimer, the term of this patent is extended or adjusted under 35 U.S.C. 154(b) by 0 days.

(21) Appl. No.: 14/337,516

(22) Filed: Jul. 22, 2014

(65) Prior Publication Data
US 2015/0082361 A1      Mar. 19, 2015

Related U.S. Application Data

(60) Provisional application No. 61/877,842, filed on Sep. 13, 2013.

(51) Int. Cl.
| *H04N 7/16* | (2011.01) |
| *H04N 21/436* | (2011.01) |
| *H04N 21/2225* | (2011.01) |
| *H04N 21/218* | (2011.01) |
| *H04N 21/2387* | (2011.01) |
| *H04N 21/41* | (2011.01) |
| *H04N 21/4147* | (2011.01) |
| *H04N 21/432* | (2011.01) |
| *H04L 12/18* | (2006.01) |
| *H04N 21/845* | (2011.01) |
| *H04N 21/8547* | (2011.01) |

(52) U.S. Cl.
CPC ...... *H04N 21/43615* (2013.01); *H04L 12/1822* (2013.01); *H04N 21/21815* (2013.01); *H04N 21/2225* (2013.01); *H04N 21/2387* (2013.01); *H04N 21/4108* (2013.01); *H04N 21/4126* (2013.01); *H04N 21/4147* (2013.01); *H04N 21/4325* (2013.01); *H04N 21/8455* (2013.01); *H04N 21/8547* (2013.01)

(58) Field of Classification Search
CPC .................................................. H04N 21/4126
USPC .................................................. 725/25, 115
See application file for complete search history.

(56) References Cited

U.S. PATENT DOCUMENTS

| 7,630,721 | B2 | 12/2009 | Ortiz | |
| 2012/0042036 | A1* | 2/2012 | Lau et al. | 709/217 |
| 2012/0291073 | A1* | 11/2012 | Friedman | 725/62 |
| 2013/0102242 | A1* | 4/2013 | Anzures et al. | 455/3.06 |
| 2014/0317659 | A1* | 10/2014 | Yasutake | 725/43 |

* cited by examiner

*Primary Examiner* — Pankaj Kumar
*Assistant Examiner* — Sahar Baig
(74) *Attorney, Agent, or Firm* — Ortiz & Lopez, PLLC

(57) ABSTRACT

Flat panel video display can wirelessly broadcast its identity for discovery to users of handheld devices (e.g., smartphones) interested in obtaining recorded data associated with video programming displaying on the flat panel video display. Data can also include text, audio, and identifying information needed to access related data from a remote server. An application can be downloaded and activated on smartphones that will enable it to see a list of available (discoverable) flat panel displays that allow wireless access to recorded video data associated with programming being displayed (or previously displayed and stored in a queue) on a flat panel. A flat panel of interest can be selected by the smartphone and it can access additional data (either directly from the flat panel or from a remote server once the data has been identified) and/or engage in an interactive session in association with the displayed programming or data.

17 Claims, 4 Drawing Sheets

SYSTEMS AND METHODS FOR ENABLING SIMULTANEOUS SECOND SCREEN VIDEO SEGMENT REPLAY DURING ONGOING PRIMARY SCREEN PROGRAMMING

INVENTION PRIORITY

This application claims priority under 35 U.S.C. 119(e) to U.S. Provisional Patent Application Ser. No. 61/877,842, entitled "Systems and Methods for Enabling Simultaneous Second Screen Video Segment Replay During Ongoing Primary Screen Programming," which was filed on Sep. 13, 2013, the disclosure of which is incorporated herein by reference in its entirety.

FIELD OF THE INVENTION

The present invention is generally related to wireless handheld devices such as smartphones and also to flat panel displays such as smart TVs. The present invention is also related to the exchange of data between electronic devices. The present invention is also generally related to digital video recording systems. The present invention is also related to data collaboration between primary and secondary screens. More particularly, the present invention is related to systems and methods that can enable video segments for scheduled programming being displayed on a primary screen to be replayed via a wireless connection on a secondary screen without interrupting the scheduled programming that is in progress and being displayed on the primary screen.

BACKGROUND

Digital video can be recorded in and streamed from digital video recording devices (i.e., Digital Video recorders, or DVRs), which are typically provided in the form of a set-top box that is generally being used as a companion device with a large video display such as a flat panel television set commonly mounted to a wall or sitting on a table, DVRs are typically provided to cable and satellite television company customers so that the customers can access and record scheduled programming. Video can also be streamed from remote servers over wired and wireless data network connections via modules installed in flat panel television sets or as companion devices such as DVD players and small boxes such as AppleTV and Roku running applications provided by pre-recorded video service providers such as Apple, Netflix, and Vudu.

Systems are now being provided with applications that enable mobile devices such as smartphones and tablet computers to stream video content to a flat panel television set via a data rendering module (e.g., AppleTV, Roku). Apple Corporation refers to its application as AirPay™, AirPlay™ enables a user to render video or other data content displayed on an iPhone on a secondary flat panel display screen connected to the AppleTV™ set-top box, U.S. Pat. No. 7,630,721 entitled "Systems, methods and apparatuses for brokering data between wireless devices and data rendering devices" issued to Ortiz also describes this capability.

Television sets today can be connected to data networks (e.g., the Internet) and are being marketed as "Smart TVs" because of their data network accessing capabilities, as well as the smartphone-like user interfaces they provide. Smart televisions and smartphones have only recently been able to interact with what is being referred to as "second screen" applications; however, applications that are currently available are limited to the wireless rendering of data that is either provided from a smartphone onto the screen of a flat panel display utilizing small gateway and video streaming devices such as those provided by Apple (e.g., Apple TV's Airplay) and Roku, or where data associated with programming displayed on the flat panel display is accessed by the second screen (e.g., smartphone) from a remote server (i.e., website) only after identifying a program being watched on a larger flat panel display to the server by name or access code.

Media sharing to flat panels directly from handhelds to flat panels has also been enabled using other wireless means or standards such as DLNA via a router, and directly with flat panel devices using WIFI direct, which has recently been accomplished with applications such as Multiscreen Play (by Hisense), AllJoyn and Snapdragon (by Qualcomm), Content Share (by Haier), Miracast (by Panasonic), SmartShare (by LG), and others. Yet all of these applications only teach sharing of data in one direction—from handheld devices (second screen) to larger flat panel devices (primary screen).

To date, flat panel displays (Smart TVs) are not known to be able to provide data directly to smartphones following a request to the flat panel initiated by the smartphone. All data delivery today appears limited to what is provided from a handheld device (smartphone, tablet, laptop) to a large data network-enabled flat panel display (Smart TV), typically by utilizing the screen/data sharing technologies describe above and as described in the '721 patent issued to Ortiz. All current data exchange solutions are also limited to interaction between two devices, a smartphone and a flat panel display/ smart TV that are already connected to each other and are wirelessly engaged to provide commands and data from the handheld device to the flat panel display or a smartphone and a remote server based on information obtained about a program being displayed on a flat panel display. There is currently no intermediary device or application that can identify information that is available for smartphone retrieval from memory based directly on what is being displayed on flat panel displays.

An interesting data access problem presents itself, for example, in a scenario where there are several screens displaying multimedia data to spectators located in a public venue (e.g., a sports bar, sports stadium, casino sports book), or even in a private den or office where multiple participants (spectators) are viewing a program. No solutions are currently available for spectators utilizing wireless handheld devices to access/select data associated with (or being rendered on) a screen, whether the screen is located in a private home or if chosen from several screens co-located at the venue where various multimedia content is being simultaneously displayed. The present inventors believe that spectators/observers at home or at a public venue would like the ability to access specific content being displayed on and/or otherwise interact with what is being displayed on any primary screen. This is especially true with respect to sports programming where fans often desire to access data associated with programming that will enable them to see a replay or review statistics.

The current inventors believe that the state of the art can be improved. Current systems do not enable a user of a mobile device (e.g., smartphone) that is serving as a second screen to retrieved segments of video of various lengths (e.g., 30 sec, 60 sec, 120 sec, 180 sec, 4 min, 5 min, 10 mins, etc.) from video content being displayed on a flat panel television set serving as a primary display without disturbing what is currently being displayed on the flat panel television set. Being able to accomplish this would be desirable when an observer of programming being displayed on the primary screen would like to replay past video from the ongoing programming without disturbing the flow of the programming when it is also being watched on the primary screen by other observers in a room. An example for when such a need would present itself is when a person is absent during a critical play in a live sporting event being displayed on a primary flat panel television set being watched by several observers (e.g., sports fans at a sports bar). The missing person may have missed the critical play when going to the restroom, or otherwise leaving the venue temporarily. Upon returning to resume watching the live sporting event on the primary screen, he is informed by another observer that he "missed a fantastic play." Usually, the person would simply miss out on seeing what happened. But, if a solution envisioned by the present inventors were available, then the person would be able to wirelessly connect his smartphone to a module associated with the primary screen and retrieve a past video segment queued in a memory and representing the past programming recently shown on the primary screen and display it on the smartphone without disturbing the associated live programming as it is being displayed on the primary screen for other observers that continue to observe. There is certainly a need for such a system given the growing demand and appetite for technology that will enhance viewing of entertainment and sports content. There is also a need for new ways to generate advertising revenue while leveraging technology such as this, which will also be described herein.

SUMMARY

It is therefore a feature of the present invention to enable portable handheld device users to use the portable handheld device (e.g., smartphone, tablet) operating as a second screen to select a video segment of past video programming being displayed on a flat panel television device from a memory contained hi a video segment replay module associated with a flat panel television display operating as a primary screen.

It is another feature of the present invention for the video segment replay module containing the memory and associated with the flat panel television device to either be incorporated directly within the flat panel device or to operate as a separate component (e.g., set top box) connected to the flat panel television device to receive or provide the video programming displayed on the flat panel television device.

It is yet another feature of the present invention to enable the video segment replay module containing the memory to broadcast its identity or the identity of the flat panel television display it is hosting via wireless communications (e.g., Bluetooth, or WiFi direct) to handheld devices utilizing an application that enables module/flat panel discovery and supports interaction of the handheld device with the module or flat panels that are discovered to be chosen by the handheld device in order to retrieve video segments of past video programming being displayed on the flat panel television display.

It is another features of the present invention for the portable handheld devices to enable operational features (wirelessly discover, select, and obtain data/associated information from a selected flat panel display) to interact with the video segment replay module and obtain video segment with an App that can be downloaded onto the portable handheld device from a server.

The present inventors believe it would be desirable to access data that has already been displayed and is now past rendering on a display screen by providing a data queue that can store/record the past video data, or identification information needed to retrieve the data from a server after the data has already been rendered on a large screen. With features of the present invention, past video data (data already displayed on a primary screen) can be retrieved from a video segment replay module containing memory operating as a video queue and capable of storing a limited amount of multimedia data previously displayed on the large screen, or from a remote server based on identifying information obtained from the module. The video segment replay module can be a set-top box, DVR, video streaming device or electronic components integrated within the flat panel television display.

The capabilities of the invention can generally be referred to as simultaneous second screen video segment replay during ongoing primary screen programming. Data associated with the replayed video can also be included with the retrieval of replay video, including audio, text, and advertisements.

In accordance with aspect for methods of the present invention, handheld device users can activate an application on their portable handheld device that can enable the user to discover a listing of available video segment replay modules associated with flat panel television displays of interest (which may be one if used at a home, or can be more when multiple screens in sports bar or casino sports book scenarios, or otherwise depending on deployment or venue) and that can allow wireless access by handheld devices to video segments of past video programming being displayed (or previously displayed and stored in a queue) on the flat panel television displays. The smartphone users can select the amount of time for the replayed video segment (e.g., a range of time options can be present to include the past 30 seconds, or up to the past ten minutes or more) from the screen of interest or video segment replay module associated with the screen of interest.

In accordance with additional features of the present invention, possible venues that can deploy the video retrieval concepts disclosed herein from a video segment replay module incorporated in or coupled to flat panel television displays that are located in: homes, lobbies, sports bars, sports venues, educational institutions, casino sports books, shopping centers, amusement parks, and the like.

In accordance with yet another feature, an application ("APP") that enables portable handheld devices such as smartphones to interact with the modules or flat panels by use of a software application that can be downloaded from application providers (e.g., Apple, Google Android, etc.).

Wireless standards that can be used to implement the invention include Bluetooth and WiFi direct, and can include other standards that may arise for transmitting video data between handheld devices and modules storing video data.

Smartphones, tablets, and laptops could also be used to access data under the teaching described herein.

Advertising can also be provided together with video segments retrieved from video segment replay modules, for display before, during or after the video segment replay is rendered on portable the handheld device.

DETAILED DESCRIPTION OF THE INVENTION

Figure 1:
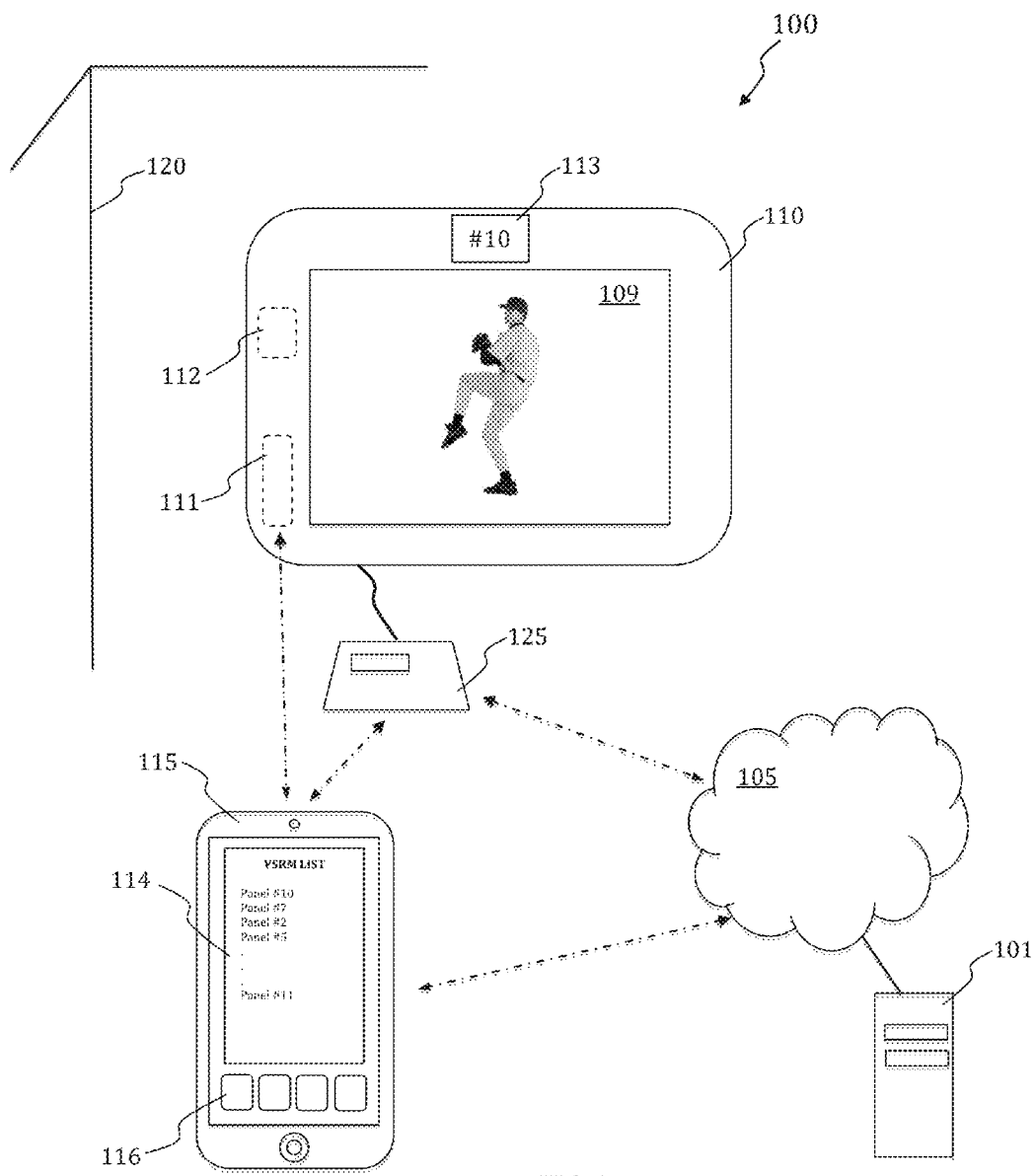
FIG. 1 illustrates a system enabling discovery of and access to data associated with programming displayed on a flat panel via a handheld device and data selected by a handheld device, wherein a video segment replay module can be standalone and attached to a flat panel display, or integrated within the flat panel, or data can be accessed from the cloud (e.g., from a remote server over a data network), and also illustrates a screen shot from a handheld device illustrating a list of flat panels wirelessly discovered for access to data therefrom.

FIG. 1. illustrates a system 100 enabling recorded video module and/or flat panel discovery and access to recorded video data associated with programming displayed on a flat panel 110 selected by a handheld device 115. A flat panel 110 can also have access to a data network 105 to retrieve programming and information from a remote server 101. The flat panel 110 can also have an internal wireless communication module 111 (e.g., WiFi or Bluetooth, or both) to support communications with nearby handheld devices 115 or to obtain further data access from the network 105. The flat panel device can include a memory 112 that can function as a queue to store programming displayed on a display screen (e.g., LCD, LED, Plasma, or the like) integrated in the flat panel, and which can include a limited amount of past programming previously displayed on the display screen 109 integrated in the flat panel. The wireless communication module can wirelessly broadcast identifying information 113 for the flat panel 110 to nearby handheld devices 115. The identifying information can be, for example, an identification number 113 (e.g., label, location or type of flat panel), or it can be a specific location in a venue/home. When multiple flat panels exists, identifying information 113 can be physically located on or near a flat panel 110 so that it can easily be read by spectators, or it can be provided as electronic information broadcasted about the physical location of the flat panel 110 in a venue 120, and broadcasted information about programming being displayed on the flat panel 110. The broadcast of wireless-enabled device identities is common for WiFi hotspots and Bluetooth connected devices, where identifying information is periodically sent for receipt by devices in search of a wireless data connection; however, flat panel television sets do not broadcast identifying information (in particular, after market labels, or physical location information), and information broadcasted from other devices today are not used for purposes of obtaining data associated with programming displayed on flat panel displays where numerous other flat panel displays may also be co-located (located next to each other) in a crowded venue (e.g., a sports bar, casino or sports stadium).

Flat panels 110 enabled with a wireless communication module 111 can be programmed with embedded or downloadable software to operate as a video segment replay module and wirelessly broadcast identifying information rather than just the manufacturer and model information. Manufacturer and model information would be useless if broadcasted from ten flat panel devices in a sports bar that are made by the same manufacturer and are the same model. This is why the use of unique identifying information is necessary in accordance with features of the present invention. Information will be described in further detail below, but can include physical location, programming information or a name/label physically attached to the flat panel to assist users in identification of the desired flat panel to interact with.

The video segment replay module functionality can be provided with a combination of hardware and software resident in either a flat panel display or a set top box. A set top box 125 is shown connected to a flat panel display in FIG. 1. Software can be downloaded as an application (or APP) from a remote server for operation on the flat panel display 110 or set top box 125. The set top box, like the flat panel display, can be connected to the Internet and remote servers for programming content and to retrieve data and applications.

The handheld device 115 can be provided in the form of a smartphone (e.g., iPhone, Android-based smartphone) and include an application 116 (an APP) that enables integration with video segment replay modules and enables the discovery of available video segment replay modules associated with flat panels 110 or set top boxes 125 located near the handheld device 115. Discovery of video segment replay modules can be accomplished by receiving identifying information 113 for the flat panel in a list of available devices 114. The flat panel 110 or set top box 125 associated with a flat panel 110 can be selected on the handheld device 115, and the handheld device 115 can then begin receiving data associated with programming displayed at the flat panel 110. The handheld device 115 can also interact with programming displayed at the flat panel 110 via the application 116.

Figure 2:
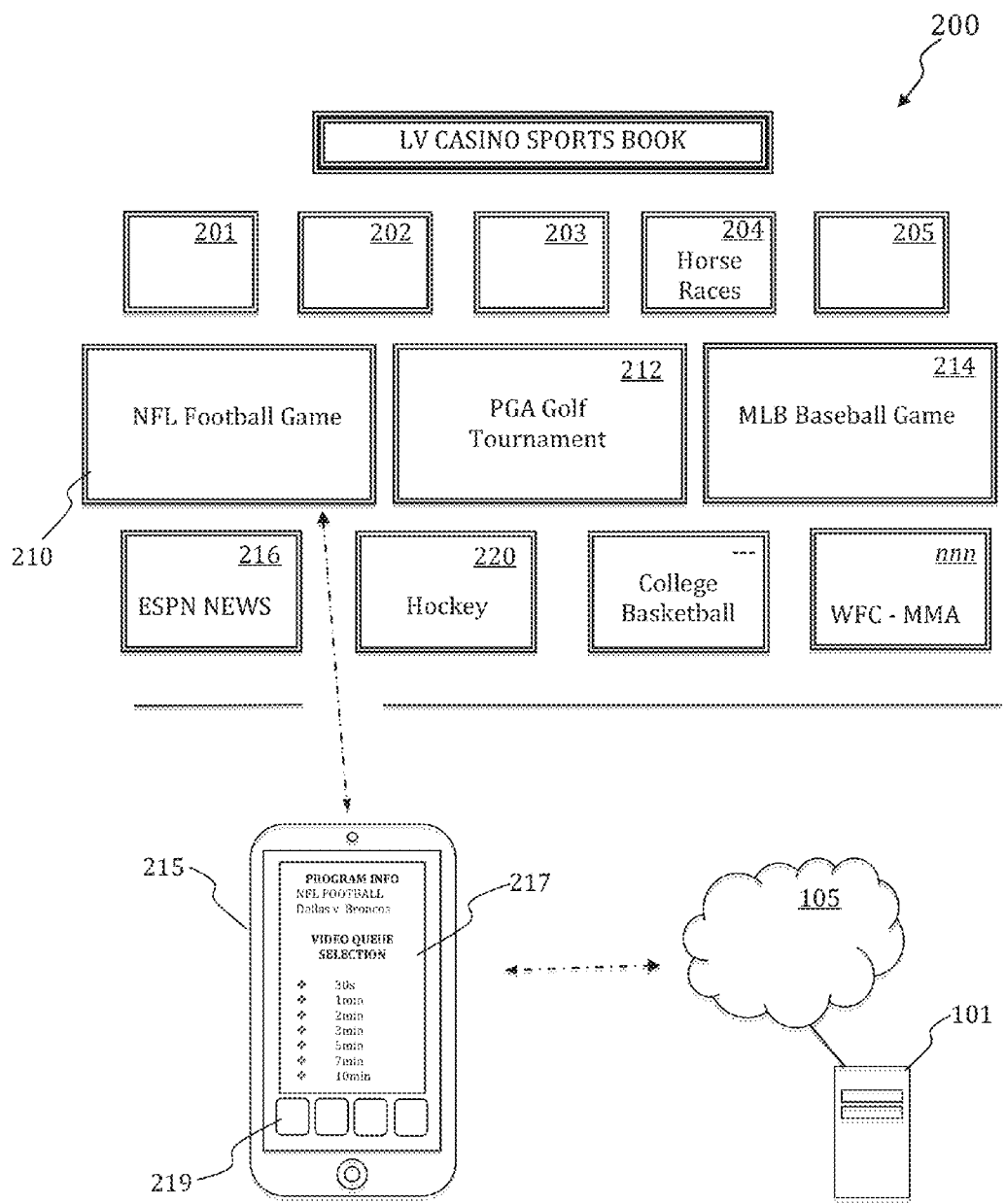
FIG. 2 illustrates a system enabling discovery of and access to data associated with programming displayed on a flat panel display selectable by the handheld device, wherein recorded video can be obtained from the recorded video module integrated in or attached to the flat panel display, or from a remote server over a data network (e.g., from the cloud) after discovery of the desired flat panel display, and also illustrates a screen shot from a handheld device illustrating the selected content and a list of replay time period options for retrieval of recorded video from storage within a queue (memory)

FIG. 2 illustrates a system 200 enabling a particular video segment replay module's discovery (integrated within a flat panel 210) and the access to data associated with programming displayed on a particular flat panel 210 selected by a handheld device 215 when several flat panel devices 212, 216, 220, nnn having (or not having) video segment replay module capability are also located near the handheld device 215 and the flat panel 210 of interest. Such a scenario would be common in a publicly accessible venue, such as a sports bar or casino sports book where multiple flat panel displays rendering various programming are available. In this type of scenario, a VSRM ("Video Segment Replay Module") application 219 can be opened on the handheld device 215 that will enable the handheld device 215 to locate the flat panel 210 of interest from among several flat panels that are also broadcasting their identities.

Identities can be determined numerically and based on content. As mentioned before, numerical identification can first be physical (e.g., by a user reading a number marked on the housing of a flat panel) and then electronic, based on information obtained physically. Identification can also be based on physical location information (e.g., "60 inch Sony-above cash register-over bar"), but identification can also be based on programming (e.g., "LA Lakers", "Dodgers" or "HGTV"). As shown in the screen shot 217 of the handheld device 215, the program info refers to a NFL Football game between Dallas and Denver. It is entirely possible that the same programming of interest will be displayed on multiple flat panels located at the same venue. In this case, any of the flat panels 212 displaying the same programming of interest can be selected for data retrieval by and/or interaction with the handheld device 215. Once common programming information of interest is identified (i.e., the same football game), regardless of the flat panel used to identify it, the handheld device 215 can retrieve programming related data from either the selected flat panel and a remote server 101 via a wireless data network 105. Also shown on the screenshot 217 is a choice of the amount of time a user wants to review (replay) for video retrieved from the memory/queue. The examples shown, without limiting the scope of the invention, are thirty seconds, 1 minute, 2 minutes, 3 minutes, 5 minutes, 7 minutes, and 10 minutes. Obviously, more or less time can be retrieved, or a user can be given a choice to enter the amount of time on a keypad associated with the touchscreen on the handheld device 215. The server 101 and data network 105 are shown because the video content, or additional related content, can also be retrieved remotely by the handheld device 215.

In accordance with features of the present invention, a system deployed in a sports stadium can enable sports fans using smartphones to interact with media being displayed at the venue to retrieve instant replays, statistics, and other data based on programming being viewed on numerous flat panel displays typically located within such a venue. A football fan, for example, can re-watch an instant replay for a programming he just viewed on a flat panel display located near his seat, a baseball fan can review additional facts statistics for an athlete shown on a flat panel that is currently at bat. The invention benefits all sports (basketball, soccer, ice hockey, tennis) so long as flat panel displays exist in the venue with the present invention capabilities and are displaying active programming to attendees. Programming information can be used by the handheld device to retrieve additional information from a remote server as previously described.

Figure 3:
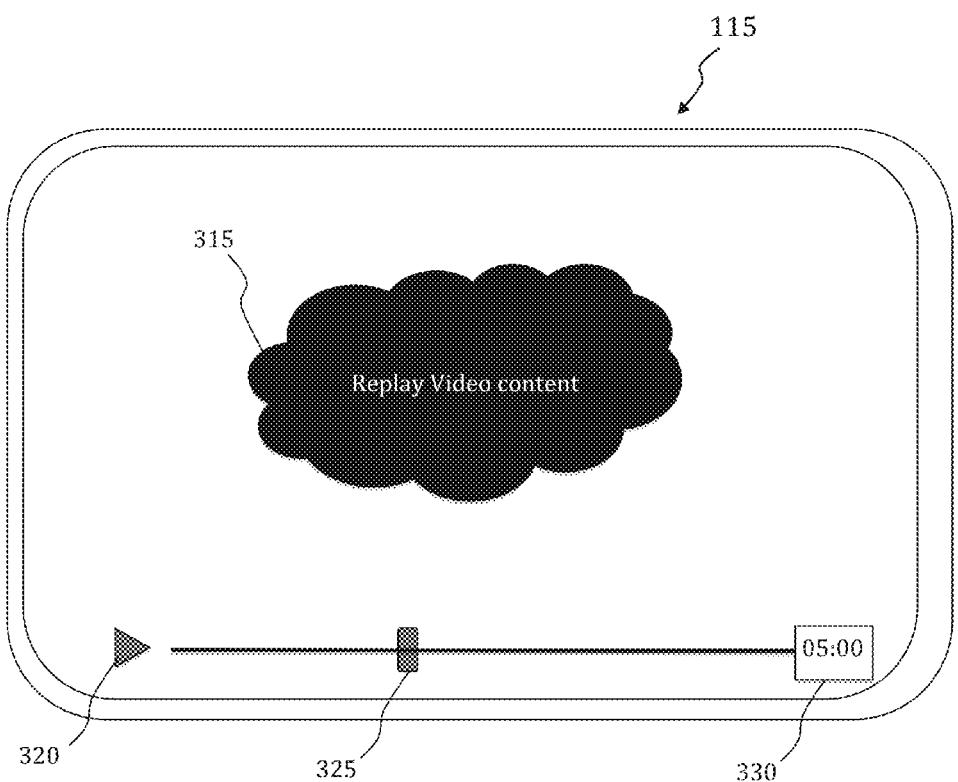
FIG. 3 illustrates a screen shot from a handheld device illustrating a video content accessed via a video segment replay module being displayed on the handheld device.

FIG. 3 illustrates a screen shot 300 from a handheld device 115 illustrating a video content 315 accessed via a video segment replay module being displayed on the handheld device 115. A handheld device user can select a flat panel from a list based on the handheld device user's programming of interest. Once selected, the handheld device 115 will be engaged in a data retrieval and/or interaction session. Data can be retrieved based on real-time programming that is being displayed on a display associated with the handheld device after being accessed/downloaded from a queue (memory) associated with a selected flat panel, a video segment replay module or an associated remote server, that can be selected and data retrieved by the handheld device. This aspect of the invention is of high value in sports media where fast moving games can cause a sports fan to miss an important play or statistical information about an athlete or team that has already passed the screen. A user can be provided with limited access to past programming from a queue associated with the flat panel device, however, a menu of past programming as described with respect to FIG. 3 will simplify access to desired information by users. The listing can be provided in the form of time (e.g., "rewind 30 seconds", "rewind 1 minute", "rewind 2 minutes") or based on identifying information (e.g., "last commercial", "$2^{nd}$-last commercial", "$3^{rd}$ last commercial"). Alternatively, the content can be displayed as recorded video with a scroll bar that can include "pause", "play", "forward", and "rewind" capabilities, similar to that provided for reviewing YouTube videos. FIG. 3 illustrates a play button 320, a scroll bar button 325 to enable a user to move back and forth within a video, and a time counter 330 showing how much longer a video is or how much time is left to review. The display of stored video content previously displayed by the flat panel and stored in the queue can also be enhanced with image tiles that pop up as the user moves along the scroll bar to help the user focus in on images for the video location that the user wants to review from the queue. Once the proper content is identified, the user can access data associated with the past programming/content.

Figure 4:
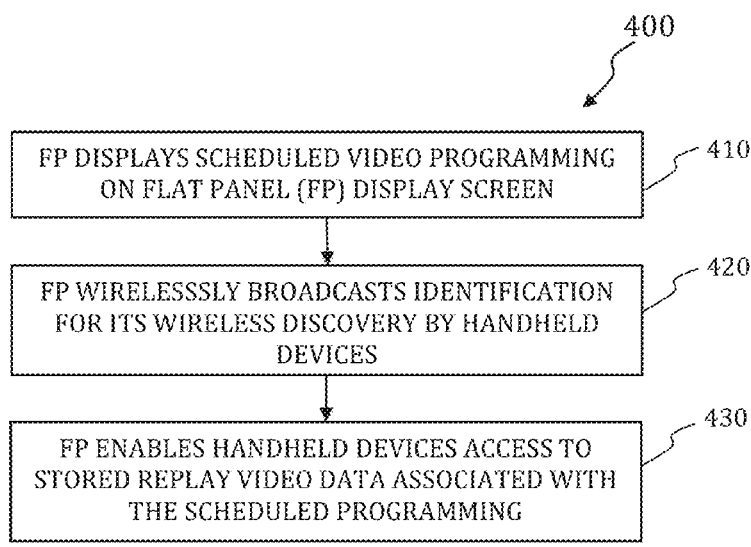
FIG. 4 illustrates a block diagram of steps for discovering a video segment replay module associated with a flat panel display with a handheld device and accessing data associated with programming displayed on the flat panel for retrieval and replay.

FIG. 4 illustrates a block diagram 400 of steps for discovering a flat panel with a handheld device and accessing data associated with programming displayed on the flat panel. As shown in block 410, a flat panel displays programming on a display screen integrated in a flat panel display. In block 420, the flat panel wirelessly broadcasts its identification for wireless discovery by handheld devices. Then, at block 430, the flat panel enables handheld devices with access to stored replay video data associated with the scheduled programming.

Figure 5:
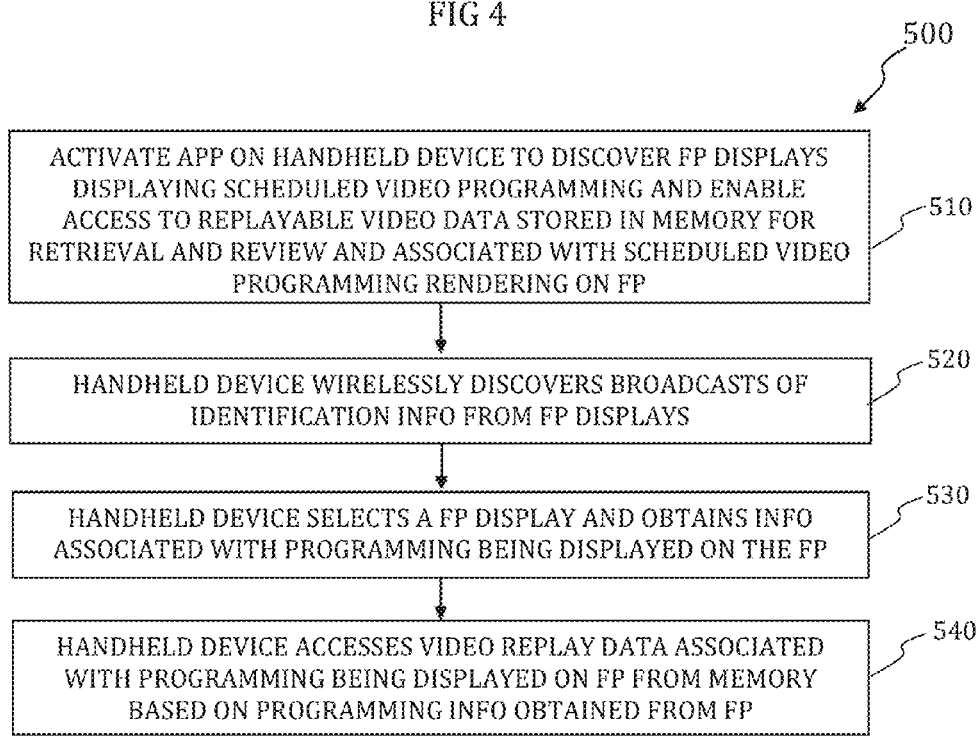
FIG. 5 illustrates a block diagram of steps enabling discovery of a flat panel device by handheld devices and for providing data associated with programming displayed on the flat panel to handheld devices.

FIG. 5 illustrates a block diagram 500 of steps enabling discovery of a flat panel device by handheld devices and for providing data associated with programming displayed on the flat panel to handheld devices. As shown in block 510, an application (VSRM application) is activated on a handheld device to discover flat panel displays that are displaying programming on a display screen integrated in a flat panel display and enabling access to replayable video data stored in memory for retrieval and review and associated with scheduled video programming rendering on the flat panel. The handheld device then wirelessly discovers broadcasts of identification information from the flat panel displays as shown in block 520. The handheld device is then used to select a flat panel display and obtains information associated with programming being displayed on the flat panel as shown in block 530. The information can include data (e.g., video, replay, etc.), but the handheld device can use information obtained from the flat panel to then access additional data associated with the programming being displaying on the selected flat panel display as shown in block 540.

It should be appreciated from the foregoing disclosure that the methods and systems described herein can be utilized in various environments including private offices or living rooms and public venues such as sports bars, casinos, sports stadiums, shopping centers, amusement parks, transportation terminals, educational institutions, and others.

The invention claimed is:

1. A method enabling handheld device access to recorded segments of past video associated with video programming being displayed on flat panel displays located within at least wireless local area network range of handheld devices, comprising:
    displaying video programming on a display screen integrated in a flat panel display;
    wirelessly broadcasting an identification of the flat panel display from a media module associated with the flat panel display, said media module also providing at least one of data identifying the recorded segments of past video data associated with the video programming or recordings of the recorded segments, said identification broadcasted for wireless discovery and selection by at least one handheld device located within the at least wireless local area network range of the flat panel display;
    connecting the media module with the at least one handheld wireless device after the at least one handheld wireless device discovers and selects the broadcasted identification for the flat panel display from among broadcasted identification from a plurality of flat panel displays located within at least wireless local area network range of the at least one handheld device;
    providing the at least one handheld device with wireless access to the recorded segments of past video data identified by the media module as associated with the video programming as the video programming is simultaneously being displayed on the display screen without interruption of the video programming as the video programming is being simultaneously displayed on the selected flat panel display; and providing from the media module to the at least one handheld device at least one recorded segment of the past video selected by the at least one handheld device with a time interval of between thirty seconds to ten minutes for review at the at least one handheld device as the video programming is simultaneously being displayed on the display screen without interruption of the video programming as the video programming is being simultaneously displayed on the selected flat panel display.

2. The method of claim 1, wherein the recorded segments are stored in a memory associated with the flat panel.

3. The method of claim 1, wherein data associated with the recorded segments are stored in a memory associated with the flat panel and the stored segments are retrievable from a remote server based on said data.

4. The method of claim 1, wherein the recorded segments are stored in a memory associated with the module.

5. The method of claim 1, wherein data associated with the recorded segments are stored in a memory associated with the module and the stored segments are retrievable from a remote server based on said data.

6. The method of claim 1, the module is included in at least one of the flat panel and a set top box.

7. The method of claim 4, the module is included in at least one of the flat panel and a set top box.

8. The method of claim 5, the module is included in at least one of the flat panel and a set top box.

9. A method enabling handheld device access to data including recorded segments of video associated with video programming rendering on flat panel displays located within wireless local area network range of the handheld device, comprising:

activating an application on a handheld device to wirelessly discover flat panel displays that are displaying video programming on a display screen integrated in the flat panel displays and enabling a user of the handheld device with access to data associated with video programming of interest to the user that is being displayed on at least one flat panel display by selecting the at least one flat panel display based on selection of identification information broadcasted from the at least one flat panel display from among broadcasted identification information simultaneously broadcasted from the flat panel displays;

wirelessly discovering broadcasts of the identification information for the flat panel displays from modules associated with each of the flat panel displays;

selecting the at least one flat panel display based on its identification information and obtaining programming information and access to data therefrom; and accessing data including recorded video segments selected by the at least one handheld device with a time interval of between thirty seconds to ten minutes for review at the at least one handheld device, wherein the recorded video segments are associated with the video programming of interest to the user and are accessible as the video programming is simultaneously being displayed on the selected flat panel display without interruption of the video programming as the video programming is being simultaneously displayed on the selected flat panel display.

10. The method of claim 9, wherein data associated with the recorded segments are stored in a memory associated with a module associated with the selected flat panel display and the stored segments are retrievable from a remote server based on said data.

11. The method of claim 10, wherein the module is included in at least one of the flat panel and a set top box.

12. The method of claim 9, wherein the module is included in at least one of the flat panel and a set top box.

13. The method of claim 9, wherein data associated with the recorded segments are stored in a memory associated with a module associated with the selected flat panel display and the stored segments are retrievable from a remote server based on said data.

14. A flat panel display comprising:

access to a data network; and a wireless data communications module providing flat panel identification information and a memory containing data associated with past video programming;

wherein said wireless data communication module broadcasts flat panel identification information and program identification data associated with video programming being displayed on the flat panel, simultaneously with broadcasts of identification information from additional flat panels, located within wireless data communications range to handheld devices adapted for requesting the data including past video data that is recorded and is associated with the video programming being displayed on the flat panel, wherein at least one handheld device discovers the flat panel display based on the flat panel identification information and requests the past video data associated with the video programming being displayed on the flat panel and the data from among broadcasted identification from a plurality of flat panel displays located within at least wireless local area network range of the at least one handheld device is obtained from at least one of said memory associated with at least one of the wireless data communication module, the flat panel or a remote server, based on an identification of the past video data, via the data network and the past video data is transferred to at least one handheld device requesting the data in recorded segments with a selectable time interval of between thirty seconds to ten minutes for review on the at least one handheld device without interruption of the video programming as the video programming is being simultaneously displayed on the selected flat panel display.

15. The method of claim 14, wherein data associated with the recorded segments are stored in a memory associated with the flat panel display and the stored segments are retrievable from a remote server based on said data.

16. The method of claim 14, wherein data associated with the recorded segments are stored in a memory associated with the flat panel display and the stored segments are retrievable therefrom.

17. The method of claim 15, wherein the module is included in at least one of the flat panel and a set top box.

* * * * *